July 8, 1969  E. J. MILLER  3,453,748
VISUAL METHOD AND DEVICES FOR AIDING TEACHING AND LEARNING
MATHEMATICAL OPERATIONS WITH SIGNED NUMBERS
Filed June 1, 1967  Sheet 1 of 2
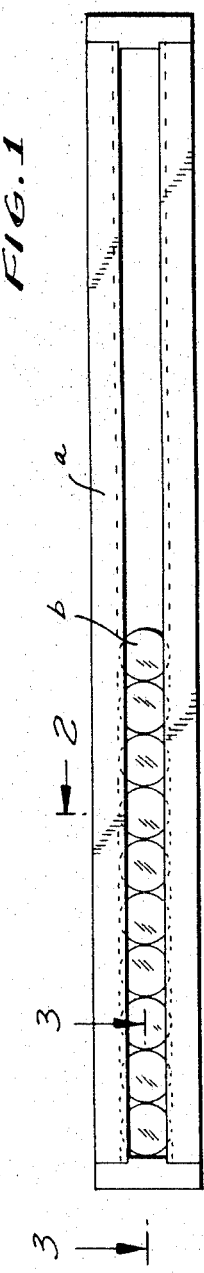
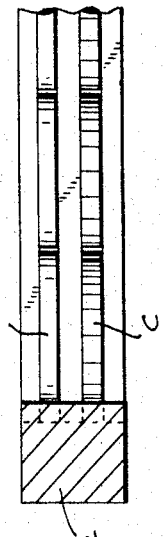
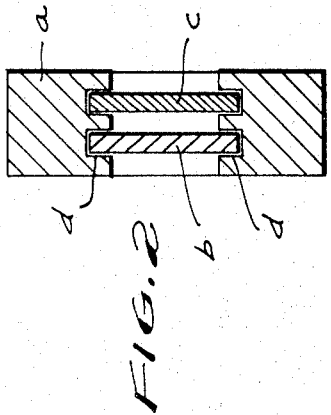
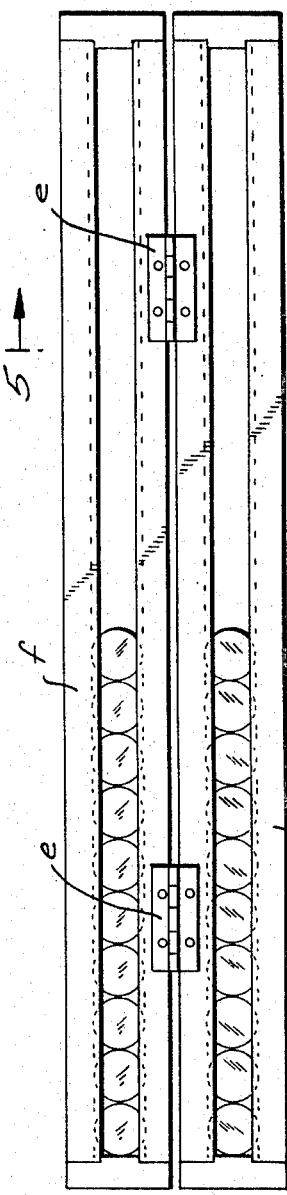
INVENTOR
ELIZABETH J. MILLER

INVENTOR
ELIZABETH J. MILLER

United States Patent Office 3,453,748
Patented July 8, 1969

3,453,748
VISUAL METHOD AND DEVICES FOR AIDING TEACHING AND LEARNING MATHEMATICAL OPERATIONS WITH SIGNED NUMBERS
Elizabeth Joan Miller, New York, N.Y.
(5143 Post Road, Bronx, N.Y. 10471)
Filed June 1, 1967, Ser. No. 643,812
Int. Cl. G09b 23/02, 19/02
U.S. Cl. 35—32                                                       8 Claims

ABSTRACT OF THE DISCLOSURE

A method for visually teaching and learning for beginners in algebra the major mathematical operations with signed numbers, involving a device for facilitating a deeper understanding thereof. The device comprises two sets of transparent discs or other transparent shapes of equal number. The said two sets have complementary colors, e.g. one set consisting of green discs and the other of red. The discs in each set represent numbers of equal absolute value but of opposite sign. When two discs of opposite color are placed over each other, the colors cancel each other and the resulting color is considered to be equivalent to zero. This becomes clearly visible against incident light or against a white background.

Figure 5:
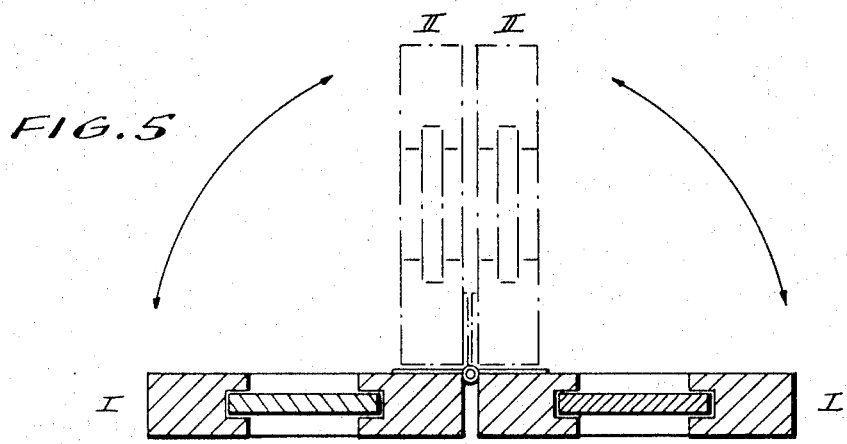

*Background of the invention—description of prior art*

This invention relates to a method and a device for making mathematical operations with signed numbers easier to understand. More particularly, the invention makes use of a device demonstrating visually the various basic operations with signed numbers.

Students of first year algebra normally accept the concept of signed numbers readily. The basic operations, addition, subtraction, multiplication and division are defined by simple rules which are explained by analogies. But experience has shown that many beginning students end to confuse these rules because they often lack a deeper understanding. Consequently, many students experience considerable difficulty when they have to apply these rules.

Pure number is the result of counting objects, such as six cows, six houses, six pencils, etc. These objects have nothing in common except the number 6. Small children familiarize themselves with the abstraction "number" by countaing objects, such as the pictures in a book, dots, etc., until they accept number as such. The basic operations, addition, subtraction, multiplication and division are gradually developed, while problems with countable objects are always referred to.

Later on, children are introduced to signed numbers with limited reference to practical examples. The concept of signed numbers will be put to practical use much later in the curriculum, when students study concepts such as magnetism and electricity involving positive and negative charges, vector quantities such as forces and velocities, chemical valences, heat balances, etc. The average young student, who is first introduced to signed numbers does not grasp the significance of what he is learning, and therefore the many rules of signs have little meaning for him. The explanations are often involved and difficult to comprehend for the beginner, and, therefore, the student must resort to memorizing them by rote for lack of deeper comprehension. This often results in confusing the rules.

For the aforestated reasons, teachers have used a variety of comparisons to achieve better comprehension, the effectiveness depending greatly on the teacher's personal skill. For example, a teacher might suggest that the operation addition is represented by gaining, and subtraction by losing. Positive numbers can be represented by income and negative numbers by expenses. Thus, adding a positive number can be stated to mean gaining an income. Subtracting a positive number is then represented by losing an income. Adding a negative number can be stated by gaining an expense, and subtracting a negative number, by losing an expense. It is obvious that "income and expense" can be replaced by other opposites, such as heat and cold, games won and games lost, etc. The results of the various examples are then translated into pure numerical problems and eventually the rules of signs are derived as a generalization of these problems.

*Summary of the invention and description of preferred embodiment*

In a principal aspect of the invention a visual aid is used by the teacher, for example with the help of an overhead projector, to demonstrate visually the basic operations with signed numbers.

It is therefore an object of this invention to use a method of teaching involving a device of super-imposable transparent discs of opposite color for explaining the nature of addition, subtraction, and including multiplication of signed numbers, and showing the correct result of each operation by number and sign in color.

It is another object of this invention to provide a method for the student with which he can check whether he has applied the algebraic rules correctly.

A further object of this invention is to provide the student with a learning aid which helps him in his thinking process by visual means to overcome difficulties in the proper application of ground rules when he tries to practice his calculating examples at home, until he has learned to understand the rules rather than memorizing them by rote, and at times confusing them.

It is well known that a visual aid can demonstrate a principle faster and better than any verbal explanation. This is especially true for the child who comes from a culturally deprived home environment. Thus, by choosing to represent the signed numbers by symbols made of a transparent material in different colors that have the property of giving a third color clearly distinguishable from the given colors when superimposed, the principles of operation with signed numbers can be demonstrated visually.

Essentially, the outstanding characteristics of the set of signed numbers, is that each number of one set has an additive inverse, i.e. a unique corresponding number in the other set such that when added to the given number, the sum thus produced equals zero. Thus, $(+3)+(-3)=0$. The so-called rules of signs are logical consequences of this concept. In accordance with this concept, the teaching-learning device contains two sets of discs of opposite colors made of transparent material, to symbolize numbers of opposite sign. The number of discs in each set is the same and the number is sufficiently large to permit a variety of practice examples. To facilitate handling these discs are best assembled and held together within a suitable frame.

In accordance with the principle of the additive inverse, when an equal number of discs of opposite colors are super-imposed, and the result is held up to incident light or placed against a white background, a distinctly new third color is effected, which symbolizes zero.

*In the drawings*

Figure 6:
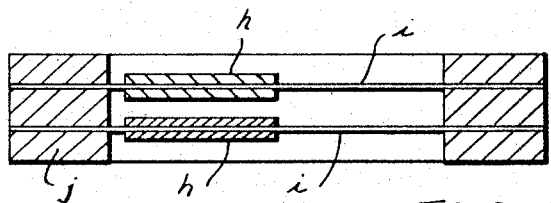
Figure 8:
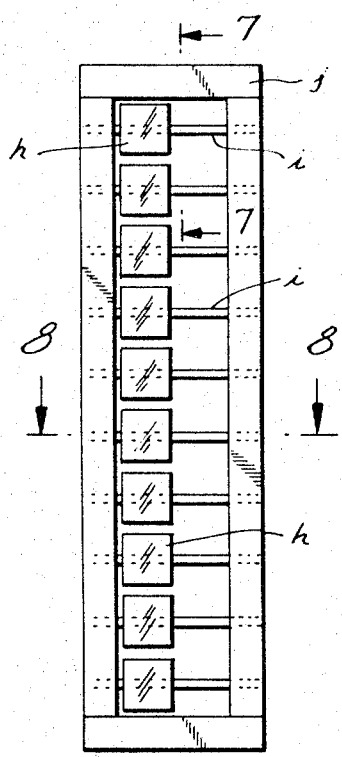
Figure 7:
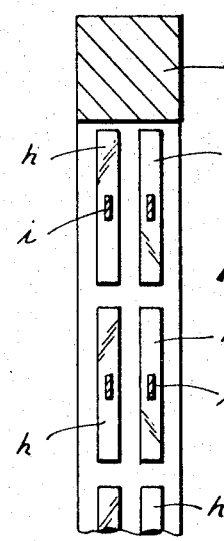

FIG. 1 shows a single frame $a$ in front elevation. FIG. 2 shows the same frame $a$ in transverse cross section and FIG. 3 in longitudinal cross section. FIGS. 4 and 5 are plan and section views of a second embodiment, FIGS. 6, 7 and 8 are side and section views of a third embodiment. Colored, transparent discs b in FIG. 1 and b and c in FIGS. 2 and 3 are mounted in the frame so that they can slide in grooves d, FIG. 2 discs b (FIGS. 2 and 3) being all of one color, and discs c FIGS. 2 and 3 being of an opposite or different color. In FIG. 1 the discs are in the "all zero" position.

Obviously, a number of such frames can be assembled to form a larger unit to provide for operations involving larger numbers.

FIGS. 4 and 5 show two frames linked together with hinges e, frame f contains one row of discs of only one color and frame g contains only one row of discs whose color is different from the color of the discs in frame f. This arrangement makes manipulation with the discs somewhat easier. The hinged frames can be spread out as seen in plan view FIG. 4 in which position the discs can be shifted in accordance with the required mathematical operation. FIG. 5 shows this position in transverse cross section I. By swinging the two frames upwards 90° to position II the differently colored discs are now superimposed.

FIGURES 6, 7 and 8 show square shaped discs h suspended on wires i in vertical arrangement in a frame j. FIG. 6 shows the frame in front elevation; FIG. 7 represents a transverse cross section and FIG. 8 a longitudinal cross section. The discs are shifted horizontally.

The following examples will serve to illustrate how the device is used to teach the basic operations. It will be noticed that in each example the result of the operation can be read directly from the device, thus confronting the student with an immediate indisputable fact.

In the examples below, the following assumptions hold throughout. The opposite colors used are red and green, red discs symbolizing positive numbers, while green discs symbolize negative numbers.

Example No. 1.—Addition of two positive numbers: $(+3)+(+4)=(+7)$.—The discs of both sets, red and green, are together in one location of the device. Slide 3 red discs to another location reserved for this purpose; then slide 4 red discs to join the other 3 discs. Push them close together and read the result against incident light which is 7 red discs, or $(+7)$.

Example No. 2.—Addition of two negative numbers: $(-3)+(-4)=(-7)$.—Start as for problem 1, then slide 3 green discs to the other location which is followed by 4 green discs. Push them together and read the result against incident light, which is 7 green discs, or $(-7)$.

Example No. 3.—Addition of a negative and a positive number: $(-4)+(+3)=(-1)$.—Slide 4 green discs into the special location. This is followed by sliding 3 red discs into the same location. The device is arranged in such a way, that the discs of opposite color can be super-imposed in the special location. The result of this operation shows, that 3 of the 4 green discs are now covered by the 3 red discs, producing 3 zeros, and one green disc remains exposed. Thus, the overall reading of the result of this addition is $(0)+(-1)$, or simply $(-1)$.

The concept of subtraction presents more difficulty to the student, especially when a larger number has to be subtracted from a smaller, and when a negative number has to be subtracted from any number. For the latter, the verbal analogies become equally complex.

Since the set of signed numbers is infinite, it can be imagined that there is always an unlimited reservoir of zeros available, all having resulted from the addition of additive inverses. On the device, this concept is represented by a sufficiently large number of discs of opposite color in a specific location. While addition is accomplished by moving discs from the all zero position to another location where the result is being read, subtraction starts from the all zero position reading the result at the location of the all zero position.

Example No. 4.—Subtracting a smaller positive number from a larger number: $(+7)-(+4)=(+3)$.—Remove 7 green discs from the reservoir of zeros, thus exposing 7 red discs. The device is now set to read $+7$. Remove 4 of the 7 red discs, and what remains, which is known as the remainder, is 3 red discs, or $+3$.

Example No. 5.—Subtracting a larger positive number from a smaller positive number: $(+4)-(+7)=(-3)$.—Remove 4 green discs from the reservoir of zeros to free 4 red discs. Now remove these 4 red discs and an additional 3 red discs from the resorvoir, making the total number removed or subtracted 7 red discs.

This operation will free 3 green discs, showing that the remainer is $-3$.

Example No. 6.—Subtracting a positive number from a negative number: $(-4)-(+7)=(-11)$.—Remove 4 green discs. Now, remove 7 additional red discs from the reservoir, freeing another 7 green discs. The result of this operation shows a remainder of 11 green discs, or $-11$.

Example No. 7.—Subtracting a negative number from a positive number: $(+4)-(-3)=(+7)$.—Remove 4 green discs from the reservoir of zeros, exposing 4 red discs. Now, remove 3 green discs, thus exposing a total of 7 red discs as the remainder, or $+7$.

Example No. 8.—Subtracting a negative number from a negative number: $(-4)-(-3)=(-1)$.—Remove 4 red discs from the resorvoir of zeros, exposing 4 green discs; then remove 3 of the 4 exposed green discs, leaving a remainder of 1 green disc, or $-1$.

The use of this device can be extended to demonstrate the multiplication of signed number inasmuch as multiplication can be defined as repeated addition or subtraction.

Example No. 9.—$(+3)\times(+2)$ means $(+2)+(+2)+(+2)$.—The device can then be used as suggested in Example No. 1. The result of the operation will show 6 red discs or positive $(+6)$.

Example No. 10.—The product of a positive and a negative number: $(+3)\times(-2)$ means $(-2)+(-2)+(-2)$.—The device can then be used as suggested in Example No. 2. The result of the operation will show 6 green discs, or $-6$.

Example No. 11.—The product of a negative and a positive number $(-3)\times(+2)$ can be defined as subtracting $(+2)$ from zero 3 times, or $0-(+2)-(+2)-(+2)$. Thus, set the reservoirs of zeros as for all subtraction problems; then remove 2 red discs from the zeros 3 times in succession, exposing 6 green discs as the result of the operation, or $(-6)$.

Example No. 12.—The product of two negative numbers $(-3)\times(-2)$ means: $0-(-2)-(-2)-(-2)$.—Proceed as for Example No. 11, removing 2 green discs from the zero 3 times in succession, exposing the remainder of 6 red discs, or positive $(+6)$.

While the use of opposite colors is preferred, it is obvious that the two sets of transparents discs may have any other colors as long as the color of one set is sufficiently distinctive from the color of the other set. When placing transparent disc of one color representing one sign over another disc of another color, representing an opposite sign the two colors do not have to extinguish or cancel each other to signfiy zero, but may display any other arbitrarily chosen composite color. Instead of useing one set of green and one set of red discs which show the best color extinction, one can use one set of blue discs and one set of yellow discs whereby the resulting green color would represent zero. Likewise, blue and red discs would form violet zeros, red and yellow would combine to demonstrate orange zeros etc.

Obviously the transparent members of each set which can be made of glass, plastic, gelatin etc. do not have to be round but may have any other shape, such as square, rectangular, oval etc.

The transparent members of each set may be sliding horizontally or vertically in a frame made of any suitable material, the members being held by slight friction, or they may be strung up or hanging on a wire or string, by loops, hooks, rings etc., they may be held in place by pressure sensitive adhesive or they can be completely loose without deviating from the original concept of the idea. Whether the individual transparent members of different colors are loose or assembled to any kind of supporting device, they can be placed on a horizontal, light-colored, preferably white surface which will show the different colors sufficiently clear without using a special source of incident light. If the transparent discs are not too intensively colored, the reflection of the white surface is sufficient to show the different colors.

The transparent members of one color can be assembled in one supporting device, such as a frame with sections in which the members or discs can slide in grooves from one side to the other or up and down, and being held by friction, and the members of another color can be assembled in an identical manner in a second holding device of the same kind. These two supports or racks or of whatever completion they may be can then be simply superimposed, or they can be assembled in one plane and be connected with hinges, such as the frames shown in FIGS. 4 and 5.

The members of both colors can also be assembled in one frame, the discs of one equal color sliding in one row and the discs of the other color sliding in a row parallel to the first row as shown in FIGS. 1, 2 and 3, or in FIGS. 6, 7 and 8, where all the discs of one color can be superimposed by an equal number of discs of the other color.

While in the foregoing there has been provided a detailed description of a method and various embodiments of the invention, it is to be understoood that all equivalents obvious to those skilled in the art are to be included within the scope of the invention as claimed.

What is claimed is:

1. As a teaching and learning aid a method for visually demonstrating the basic mathematical operations with signed numbers involving the use of two sets of transparent disc-like shapes, one of said sets being significantly different in color from the other set comprising the steps of, ascribing to one color a positive sign and to the other color a negative sign, and ascribing to each disc-like shape of each color the same number value; placing one set of transparent colors over the other set to superimpose discs of one color over discs of the other color, the composite color produced by each pair of superimposed, differently colored discs as a representation of "zero," said composite color having cancelled the color of each individual disc, and manipulating the discs of each color by removing from the reservoirs of "zeros" the "opposite" colors to obtain the properly signed number for starting the desired mathematical operation, and adding or removing as the case may be, the desired positive or negative colors.

2. Teaching and learning apparatus for visually displaying the effects of performing arithmetic operations with signed numbers, said apparatus comprising: a first set of members of like color to which is assigned a sign value; a second set of members of a like color different than that of said first set to which is assigned a sign value different from that of said first set; and means for supporting a number of members of the first set equal in number to one of the numbers of the arithmetic operation to be performed and a number of members of the second set equal in number to another number of the arithmetic operation to be performed, with as many pairs as possible of the members of the first and second set supported in a relationship permitting their colors to be combined so that the number of and color of any excess of unpaired members will indicate the quantity and sign of the desired answer.

3. As a teaching and learning aid for visually displaying the basic operations with signed numbers, a device comprising: a frame having at least two parallel tracks provided thereon; a first set of transparent members of like size shape and color mounted for sliding on one of said tracks; a second set of transparent members of the same size and shape as the members of said first set but of a different color arranged on the other of said tracks, the tracks having a length of at least twice the sum of the width of the members of one set in a direction along the track, both sets of members supported by the tracks so that a member of one color can be superimposed with respect to a member of the other color, each of the sets of members representing an opposite sign value and each individual member representing an equal number value, said differently colored members when superimposed providing a color representing zero which is significantly different from the color of said first or second set of members.

4. A device as in claim 3 in which said frame is formed in two parts hinged to each-other, with one of said parallel tracks in one of the parts of the frame and the other of said parallel tracks in the other part of the frame, whereby said parts of the frame may be positioned to superpose the colored members supported on the tracks of one frame part over the members supported on the tracks of the other frame part.

5. A device as in claim 3 in which said tracks comprise a wire extending along the frame and threaded through said members to support said members for relative movement, with one set of member supported in a plane spaced from the other set of members.

6. A device as in claim 3 in which said tracks comprise a pair of spaced grooves in opposed walls of said frame in which grooves said members are slideable.

7. A method for visually demonstrating the basic mathematical operations with signed numbers, said method comprising the steps of providing a first set of members of like color to which are ascribed a positive sign; providing a second set of like colored members to which are ascribed a negative sign; combining a number of members of each group equal in number to the numbers in the mathematical operation to be performed; impinging light upon the combined members; and combining the light transmitted from each pair of said members of different color upon which the light has been impinged to obtain a color different from that of said members to which color a zero value is ascribed, whereby the color and number of the remaining combined members indicates the desired answer and sign.

8. A method of visually displaying the effects of performing arithmetic operations with signed numbers, said method comprising the steps of placing a first set of a number of a number of transparent members of like color to which are ascribed a sign equal in number to one of the numbers in the arithmetic operation to be performed; placing a second set of a number of transparent members of a different color to which are ascribed a different sign over the first set of transparent members with as many pairs of superposed members of the first set and second set being formed as possible so that any excess of unpaired members will indicate the quantity and sign of the desired answer.

References Cited

UNITED STATES PATENTS

| | | | |
|---|---|---|---|
| 651,892 | 6/1900 | Schneider | 35—32 |
| 1,183,570 | 5/1916 | Kneeshaw | 35—32 X |
| 1,941,733 | 1/1934 | Badanes | 35—32 X |
| 2,899,755 | 8/1959 | Terilli | 35—28.3 |
| 2,917,836 | 12/1959 | Balinkin et al. | 35—28.3 |

LAWRENCE CHARLES, *Primary Examiner.*